United States Patent
Stählin et al.

(10) Patent No.: US 9,591,024 B2
(45) Date of Patent: Mar. 7, 2017

(54) DATA SELECTION METHOD FOR REDUCING THE DECODING COMPUTATIONAL COMPLEXITY OF A VEHICLE-TO-X COMMUNICATION SYSTEM, AND VEHICLE-TO-X COMMUNICATION SYSTEM

(75) Inventors: Ulrich Stählin, Eschborn (DE); Richard Scherping, Liederbach am Taunus (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 189 days.

(21) Appl. No.: 14/129,575

(22) PCT Filed: Jul. 4, 2012

(86) PCT No.: PCT/EP2012/063043
§ 371 (c)(1),
(2), (4) Date: Feb. 5, 2014

(87) PCT Pub. No.: WO2013/004750
PCT Pub. Date: Jan. 10, 2013

(65) Prior Publication Data
US 2014/0143834 A1    May 22, 2014

(30) Foreign Application Priority Data
Jul. 5, 2011 (DE) .......... 10 2011 078 704

(51) Int. Cl.
G06F 7/04 (2006.01)
H04L 29/06 (2006.01)
H04L 29/08 (2006.01)

(52) U.S. Cl.
CPC .......... H04L 63/20 (2013.01); H04L 67/12 (2013.01); H04L 69/22 (2013.01)

(58) Field of Classification Search
CPC .................. H04L 63/08; H04L 63/10
(Continued)

(56) References Cited

U.S. PATENT DOCUMENTS

2005/0027787 A1    2/2005  Kuhn et al.
2005/0278524 A1*  12/2005  Diehl .......... H04L 63/0428
                                                     713/150
(Continued)

FOREIGN PATENT DOCUMENTS

DE    198 57 782 A1    8/2000
DE    601 16 964 T2    8/2006
(Continued)

OTHER PUBLICATIONS

ETSI TS 102 637-2—Mar. 2011—Intelligent Transport Systems; Vehicular Communications; Basic Set of Applications; Part 2: Specification of Cooperative Awareness Basic Service.
(Continued)

*Primary Examiner* — Anthony Brown
(74) *Attorney, Agent, or Firm* — Brinks Gilson & Lione

(57) ABSTRACT

A data selection method for reducing the decoding computational complexity of a vehicle-to-X communication system. The communication unit is used to transmit and receive vehicle-to-X messages, wherein the vehicle-to-X messages each include at least one useful data portion and at least one header data portion, wherein the at least one header data portion in each case is transmitted in uncoded form, and wherein the at least one useful data portion in each case is transmitted in coded form. The received vehicle-to-X messages are weighted into at least two categories on the basis of the at least one header data portion in each case, wherein the at least one useful data portion in each case is decoded on the basis of the weighting.

12 Claims, 3 Drawing Sheets

(58) Field of Classification Search
    USPC .......................................................... 726/3
    See application file for complete search history.

(56) References Cited

U.S. PATENT DOCUMENTS

| | | |
|---|---|---|
| 2006/0291803 A1 | 12/2006 | Watson et al. |
| 2007/0180151 A1* | 8/2007 | Richardson ............. H04L 67/12 709/248 |
| 2008/0122576 A1* | 5/2008 | Chen .................. G05B 19/0421 340/5.6 |
| 2009/0124193 A1 | 5/2009 | Mitzel et al. |
| 2009/0133121 A1 | 5/2009 | Falk |
| 2010/0303048 A1* | 12/2010 | Stahlin .................. H04W 84/12 370/338 |
| 2011/0069835 A1 | 3/2011 | Maliszewski et al. |
| 2011/0098877 A1* | 4/2011 | Stahlin .................... H04L 67/12 701/31.4 |

FOREIGN PATENT DOCUMENTS

| | | |
|---|---|---|
| DE | 10 2007 053 255 A1 | 5/2009 |
| DE | 10 2008 060 231 A1 | 6/2009 |
| DE | 10 2011 003 624 A1 | 8/2012 |
| WO | WO 02/056147 A2 | 7/2002 |

OTHER PUBLICATIONS

Design of a Vehicle-to-Vehicle Communication System on Reconfigurable Hardware—Oliver Sander et al.

Car-to-Car Communication Security on Reconfigurable Hardware—Benjamin Glas et al.

N.N./Intelligent Transport Systems (ITS) Vehicular Communications; Basic Set of Applications; Part 3; Specifications of Decentralized Environmental Notification Basic Service/ Jan. 9, 2010.

* cited by examiner

DATA SELECTION METHOD FOR REDUCING THE DECODING COMPUTATIONAL COMPLEXITY OF A VEHICLE-TO-X COMMUNICATION SYSTEM, AND VEHICLE-TO-X COMMUNICATION SYSTEM

CROSS REFERENCE TO RELATED APPLICATIONS

This application claims priority to German Patent Application No. 10 2011 078 704.6, filed Jul. 5, 2011 and PCT/EP2012/063043, filed Jul. 4, 2012.

FIELD OF THE INVENTION

The invention relates to a data selection method for reducing the decoding computational complexity of a vehicle-to-X communication system according to the, a vehicle-to-X communication system, and the use thereof.

BACKGROUND

Vehicle-to-X communication systems which are designed for transmitting traffic-related data and various service data items such as, for example, entertainment applications, are already known in the prior art. Vehicle-to-X communication is based here both on the exchange of data between vehicles (vehicle-to-vehicle communication) and the exchange of data between vehicles and infrastructure devices (vehicle-to-infrastructure communication). In order to avoid overloading the limited number of communication channels available for the transmission of data, the transmitted vehicle-to-messages are often at least partially compressed. Compatibilization of the data format of the vehicle-to-messages is also known in the prior art in order to enable two-way communication between vehicle-to-X communication systems of different types. Owing to the stringent requirements regarding the reliability and data security of information transmitted by means of vehicle-to-X communication, information of this type is often additionally provided with a complex security signature.

DE 10 2008 060 231 A1 describes in this context a method for selecting different data transmitted by means of vehicle-to-X communication. On the basis of a data frame, the received data is differentiated by a data filter in the receiver device and passed on, for example, to a driver assistance system or an entertainment device. This permits the received data to be sorted before its actual processing. For the transmission of the data, transmitter and receiver devices based on the WLAN Standards 802.11a/b/g/n at 2.4 GHz or the WLAN Standard 802.11p at 5.9 GHz are used. In order to transmit the data redundantly and to increase the reliability of the transmission, simultaneous transmission on both WLAN frequencies is also possible.

The unpublished document DE 10 2011 003 624 describes a method for reducing the data load of a vehicle-to-X communication channel in which a vehicle-to-X message is transmitted in at least a first and a second partial message over various communication channels. The first partial message contains here traffic-safety-relevant information, while the second partial message contains a security header and traffic-safety-relevant information which is partially identical to the first partial message. The portion of an overall message which is relevant for the data security is therefore transmitted exclusively via the second partial message, as a result of which the scope of the data of the first partial message remains low. The checking of the data security and reliability of the first partial message can then be carried out by means of the second partial message in that the traffic-safety-relevant information items respectively contained in the two messages are compared. If these information items correspond, traffic-safety-relevant information contained exclusively in the first partial message is also trusted. A computational intensive evaluation of a security header or decoding of the first message is therefore likewise not necessary.

Document DE 10 2011 006 305 which is unpublished discloses a method for reducing the computational load during data security checking of data packages which are received by means of vehicle-to-X communication. The data security checking is composed here of checking a signature which is encrypted by means of cryptographic algorithms and which is associated with high computational complexity and requires the use of dedicated electronics. In order to reduce the computational load, firstly pre-processing of the received vehicle-to-X message is performed, which pre-processing prioritizes said messages into different categories. The prioritization can be carried out here, using different criteria such as, for example, distance of the transmitter from the receiver or TTC (time to collision) of the transmitter with the receiver. Firstly, only the signatures of data packages provided with high priority are checked. If free computational capacity is still subsequently available, further data packages are checked. The possibilities are likewise described of verifying the content of a data package by means of surroundings sensor data, which makes checking of the signature superfluous.

However, all the vehicle-to-X communication methods known in the prior art have in common the fact that in so far as prioritization or other pre-sorting of the received information is performed or the transmitted information is split into a plurality of partial messages, this is performed only with an aim to reducing the computational work to be carried out in order to check the data security. On the contrary it is even known firstly to decode the useful data of a vehicle-to-X message and, under certain circumstances, dispense with data security checking depending on the information content of said message. In contrast, no significance is accorded to the computational work necessary to decode the useful data in the prior art even though the processors used at present for this purpose involve comparatively high manufacturing costs owing to their necessary computational capacity.

The object of the present invention is therefore to reduce the decoding computational complexity of a vehicle-to-X communication system with respect to the useful data portions of received vehicle-to-X messages.

This object is achieved according to the invention by means of the selection method for reducing the decoding computational complexity of a vehicle-to-X communication system and the vehicle-to-X communication system as described herein.

SUMMARY AND INTRODUCTORY DESCRIPTION OF THE INVENTION

According to the data selection method according to the present invention for reducing the decoding computational complexity of a vehicle-to-X communication system, vehicle-to-X messages are received and transmitted by means of a communication unit, wherein the vehicle-to-X messages each a fine at least one useful data portion and at least one header data portion. The at least one header data portion in each case is transmitted in an uncoded form and the at least one useful data portion in each case is transmitted in an encoded form. The method is defined by the fact that received vehicle-to-X messages are weighted with respect to one another into at least two categories on the basis of the at least one header data portion in each case, wherein the at least one useful data portion is decoded in each case as a function of the weighting. The weighting of the received vehicle-to-X messages within the scope of the method according to the invention provides the advantage that not all the useful data portions of the received vehicle-to-X messages have to be decoded independently of their relevance for the vehicle in question. This in turn makes it possible nevertheless to acquire all the relevant information and, if appropriate, further process it or react to it, with significantly reduced configuration of the computing power of the encoding unit and therefore significantly lower manufacturing costs. The header data portion which is transmitted in unencrypted form and the information contained therein, which can be directly read and processed, provide here a basis, which can be evaluated at low cost, for the reliable weighting of vehicle-to-X messages.

There is preferably provision that encoding the at least one useful data portion includes data compression and/or compatibilization, and the decoding of the at least one useful data portion includes data compression and/or system-dependent data conversion. Since the encoding includes data compression or data compatibilization of the vehicle-to-X messages to be transmitted, on the one hand the volume of the data transfer is kept as low as possible. This is an important advantage with respect to the limited transmission bandwidth, provided for the vehicle-to-X communication, given the simultaneously large number of communication subscribers. On the other hand, the compatibilization ensures that communication subscribers with different vehicle-to-X communication systems can also communicate with one another, independently of an internally used, under certain circumstances manufacturer-dependent, data format.

In a further preferred embodiment there is provision that the at least one header data portion includes at least one of the following information items:
satellite-supported position information of a transmitter,
speed information of the transmitter,
orientation information of the transmitter,
identification information of the transmitter,
time stamp,
type information of the vehicle-to-X message, and
accuracy characterization of at least one of the total included information items.

This information provides a secure basis for the weighting of received vehicle-to-X messages with respect to their relevance for the receiver. It is therefore possible, for example, for vehicle-to-X messages of transmitters which are located far enough away from the receiver, which are located behind the receiver and at the same time have a different orientation, or else vehicle-to-X messages whose time stamp has exceeded a certain time threshold and characterizes the vehicle-to-X message as no longer current, to be weighted as comparatively less relevant or as irrelevant with respect to the decoding.

There is expediently provision that the header data portion has a data format which can be processed essentially by all vehicle-to-X communication systems which are known per se, without preceding decoding. This provides the advantage that the header data portion can be used immediately in a simple way by all the receivers for weighting received vehicle-to-X messages. A separate compatibilization step for converting the header data portion into a suitable data format is therefore not necessary. This avoids both unnecessary computational complexity and the need to keep additional computational capacity available.

Furthermore, it is advantageous that the at least two categories characterize the vehicle-to-X messages assigned to them as "relevant" or "irrelevant", wherein only messages which are characterized as "relevant" are decoded. This is a both simple and effective possibility for categorizing or weighting vehicle-to-X messages and therefore significantly reducing the decoding computational complexity.

Furthermore, it is preferred that the weighting of the vehicle-to-X messages received during the vehicle operation can be adapted as a function of at least one of the following factors:
net weight of the receiver,
relative speed of receiver with respect to the transmitter,
distance of the receiver from the transmitter,
expected entry point of the transmitter into a critical zone around the receiver,
relative direction of travel of the receiver with respect to the transmitter, and
class of road,
wherein the critical zone has an adaptable extent and shape, and wherein the class of road is formed as a function of a permissible maximum speed and/or a lane width and/or a number of lanes and/or vicinity to localities and/or weather conditions. This ensures that during the weighting of the vehicle-to-X messages the present circumstances are always allowed for, and all the vehicle-to-X messages of current relevance are decoded and evaluated.

In a further preferred embodiment of the invention there is provision that the weighting is performed in a number of categories corresponding to the number of received vehicle-to-X messages, wherein the useful data portions of the received vehicle-to-X messages are decoded in a falling weighting sequence until the computational capacity is exhausted or all the useful data portions of the received vehicle-to-X messages are decoded. Weighting in a number of categories corresponding to the number of received vehicle-to-X messages provide the advantage of very fine gradation of the individual categories since they are sorted with respect to one another in the sequence of their relevance. The more relevant a vehicle-to-X message, the higher its weighting. The available computational capacity is very largely exploited in an optimum way since all the received vehicle-to-X messages are decoded in a falling weighting sequence until the computational capacity is exhausted or all the useful data portions are decoded. As long as uncoded useful data portions are still present and computational capacity is still available the decoding process of other vehicle-to-X messages is not interrupted.

The method according to the invention is preferably distinguished by the fact that the decoding of the useful data portion is preceded by data security checking, known per se, of a data security portion of the vehicle-to-X message, in particular by data security checking, known per se, of a digital data security certificate which is included in the vehicle-to-X message. This makes it possible to reduce further the number of useful data portions to be decoded since a vehicle-to-X message whose data security checking shows that the vehicle-to-X message is not trustworthy is appropriately not decoded subsequent to the data security checking. Nevertheless, this procedure does not result in a loss of information since the information content of the useful data portion was not detected as being trustworthy and therefore would, in any case, not be processed further after its decoding for safety reasons.

Furthermore, it is advantageous that the decode useful data portion is further processed by at least one driver assistance system, wherein the at least one driver assistance system is designed to warn a driver and/or to engage in the vehicle controller and/or to oversteer a driver's predefined value. This provides the advantage that the useful data of the received vehicle-to-X messages can be used to avert hazardous situations and, if appropriate, even to avoid accidents without the involvement of the driver or contrary to a control input of the driver.

There is particularly preferably provision that the encoding takes place according to the ASN.1 Standard. This standard has already been tested successfully in respect of vehicle-to-X communication by the ETSI (European Telecommunications Standards Institute) and is expected to be applied in vehicle-to-X communication systems used in future.

The invention also relates to a vehicle-to-X communication system, which carries out, in particular, the method according to the invention and includes a communication unit for receiving and transmitting vehicle-to-X messages, a generating unit for generating vehicle-to-X messages, to be transmitted, in at least one header data portion in each case and at least one useful data portion in each case, an encoding unit for encoding the in each case at least one useful data portion of the vehicle-to-X messages to be transmitted, and for decoding in each case at least one encoded useful data portion of received vehicle-to-X messages, and a weighting unit for processing in each case at least one uncoded header data portion of the received vehicle-to-X messages. The system according to the invention is characterized in that the weighting unit weights the received vehicle-to-X messages with respect to one another into at least two categories on the basis of the at least one header data portion in each case and wherein the encoding unit carries out decoding with the in each case at least one useful data portion as a function of the weighting. The system according to the invention therefore includes all the necessary devices for carrying out the method according to the invention and easily permits the necessary decoding computational complexity to be reduced. The advantages already described result from this.

The system is preferably distinguished in that the system additionally includes a data security unit for producing a data security portion of the vehicle-to-X messages to be transmitted and for checking the data security portion of the received vehicle-to-X messages. As a result, the reliability of vehicle-to-X messages can also be checked independently of their weighting or relevance. With respect to the fact that the vehicle-to-X messages are, under certain circumstances, used by suitable driver assistance systems, as a basis for autonomous vehicle control interventions, the data security unit therefore permits the safety of the vehicle in traffic to be increased.

Furthermore, it is advantageous that the communication unit and/or the generating unit and/or the weighting unit and/or the encoding unit and/or the data security unit includes a common chip set, in particular a common electronic computing unit. This provides the advantage that it is not necessary to provide each of the specified devices with a separate computing unit, which both further simplifies the manufacturing process and further reduces the production costs. The common access of different devices to the same computing unit additionally results in effective and rapid data linking of the devices.

There is preferably provision that the communication unit is designed to communicate by means of at least one of the following types of connection:
WLAN connection, in particular according to IEEE 802.11,
ISM connection (industrial, scientific, medical band),
Bluetooth,
ZigBee,
UWB,
WiMax,
infrared link and
mobile radio link.

These types of connection provide different advantages here in terms of the type, wavelength and data protocol used.

Thus, some of the specified types of connection permit, for example, a comparatively high data transmission rate and a comparatively fast connection set-up, while others are well suited for transmitting data around line-of-sight obstacles. The combination and simultaneous or parallel use of a plurality of these types of connection result in further advantages since in this way disadvantages of individual types of connection can also be compensated for.

Furthermore, the present invention relates to the use of the method to reduce the decoding computational complexity of a vehicle-to-X communication system in a motor vehicle.

BRIEF DESCRIPTION OF THE DRAWINGS

Further preferred embodiments can be found in the following description of an exemplary embodiment with reference to figures.

In the drawings.

DETAILED DESCRIPTION

Figure 1:
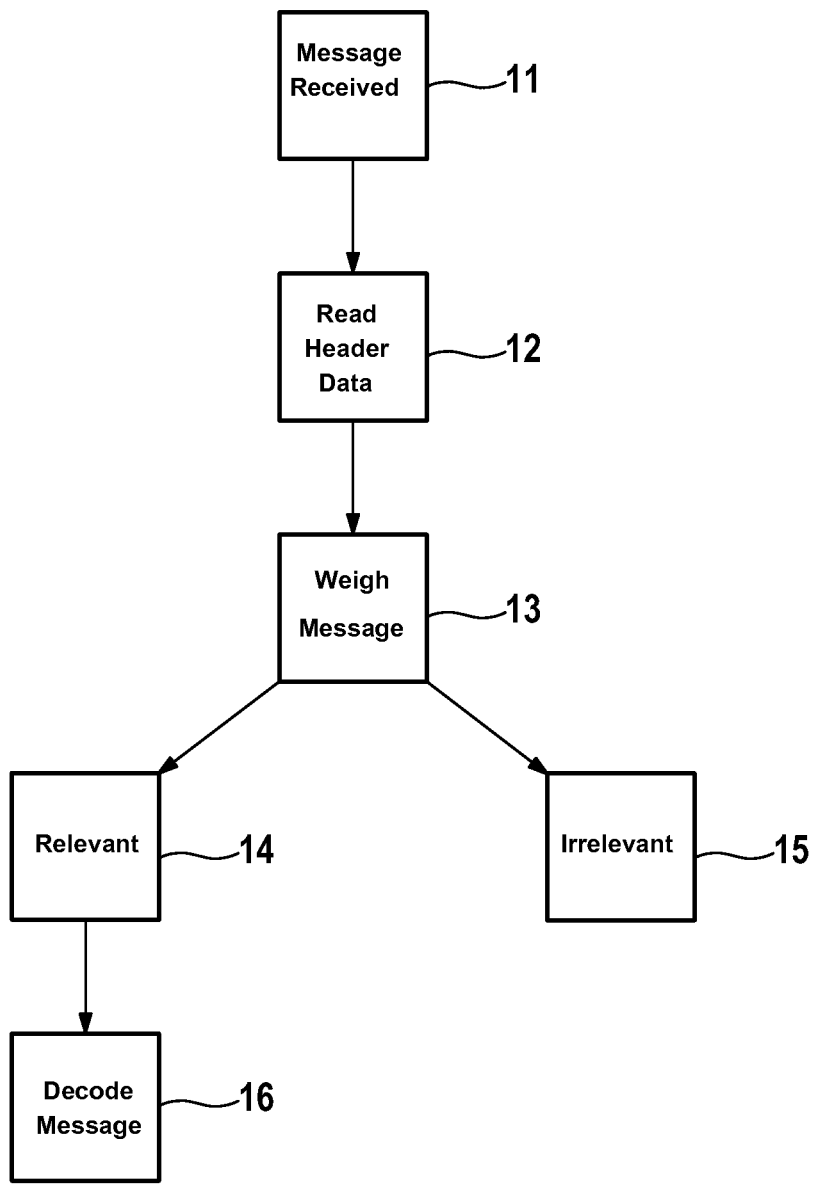
FIG. 1 shows a flowchart which represents the individual sequence steps of a possible embodiment of the method according to the invention.

FIG. 1 shows the sequence of the method according to the invention as a flowchart. In step 11, a vehicle-to-X message is received by means of a communication unit. In the following step 22, the header data portion of the vehicle-to-X message is read and evaluated. In step 13 the vehicle-to-X message is weighted as a function of the evaluation of the header data portion, which weighting characterizes the vehicle-to-X message either as "relevant" in step 14 or as "irrelevant" in step 15. A vehicle-to-X message which is characterized as "relevant" in step 14 is subsequently decoded in step 16 by means of an encoding unit. A vehicle-to-X message which is characterized as "irrelevant" in step 15 is not processed further since the useful data portion of this vehicle-to-X message has a high degree of probability of not containing any information which is significant for the user.

Figure 2:
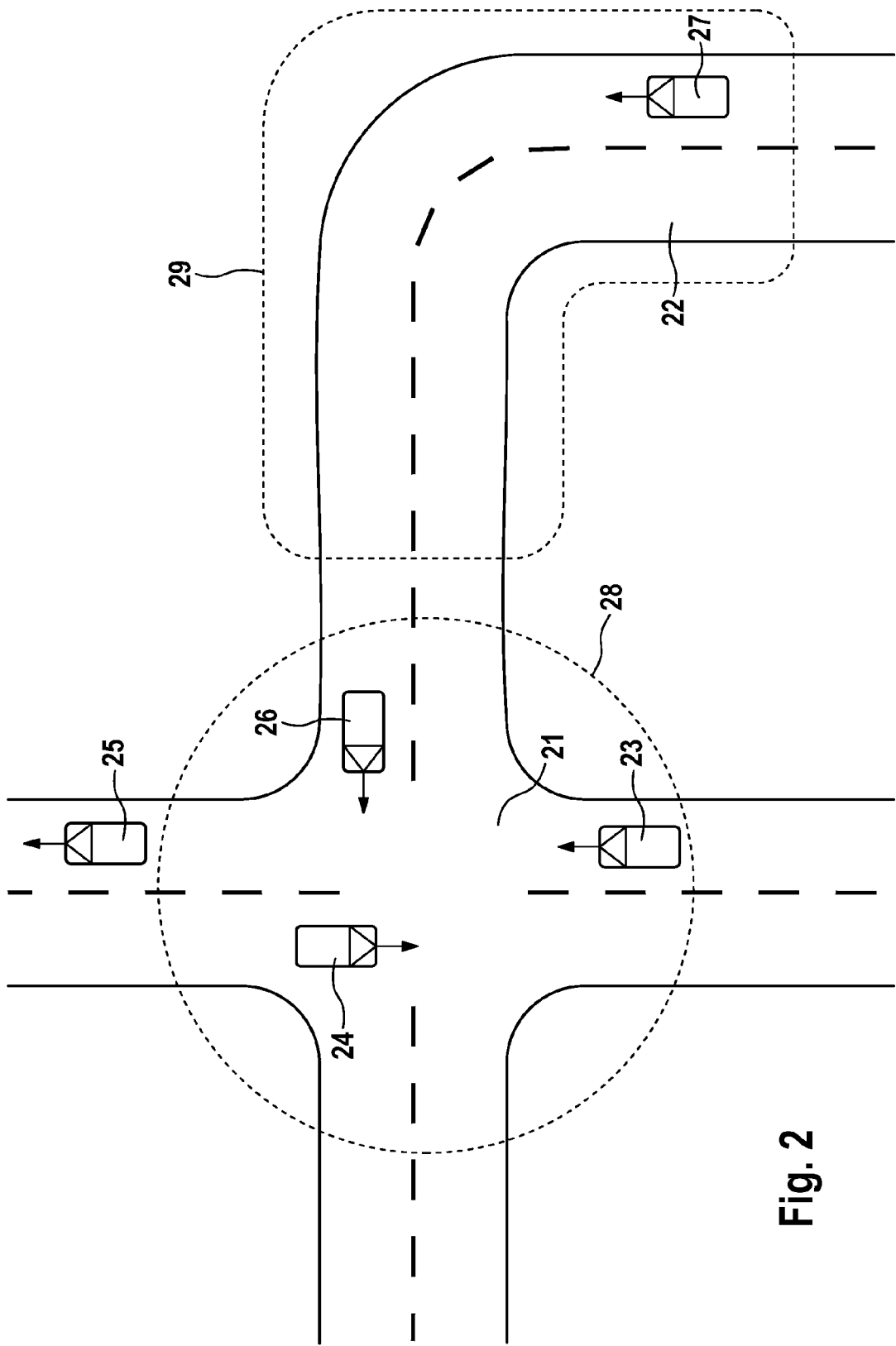
FIG. 2 is a schematic view of a traffic situation in which the method according to the invention is used.

FIG. 2 is a schematic illustration of a traffic situation in which the method according to the invention is used. Vehicle 23 is equipped with a vehicle-to-X communication system which is executing the data selection method according to the invention for reducing the data computational complexity and is entering the intersection 21. The direction of travel of the vehicle 23 is illustrated by an arrow. Vehicles 24 and 26 are also entering the intersection 21, and are also equipped with vehicle-to-X communication systems. The vehicle 25, which has just passed the intersection 21, also has a vehicle-to-X communication system. The directions of travel of the vehicles 24, 25 and 26 are each indicated by arrows. The vehicles 24, 25 and 26 each transmit vehicle-to-messages with a transmission frequency of 10 Hz, said vehicle-to-messages being composed of an encoded useful data portion and an uncoded header data portion. The header data portion contains here in each case GPS-based position information of the transmitting vehicle, a speed indication of the transmitter and orientation information of the transmitter. The vehicle 24 additionally transmits a time stamp which is contained in the header data portion and which is based on GPS information and which characterizes the vehicle-to-X messages transmitted by the vehicle 24 as current. The vehicle 23 here receives the vehicle-to-X messages transmitted by the vehicles 24, 25 and 26 and carries out the method according to the invention in order not to have to decode all the useful data portions of the received vehicle-to-X messages. For this purpose, the GPS positions of vehicles 24, 25 and 26, transmitted in an uncoded form, are firstly evaluated. The GPS position of the vehicle 25 reveals here that the vehicle 25 is located outside the critical zone 28 of the vehicle 23 and is additionally moving away from the vehicle 23 at a high speed, as a result of which the distance between the vehicles 23 and 25 increases rapidly. The received vehicle-to-X messages from the vehicle 25 are therefore characterized as "irrelevant" and not decoded. The critical zone 28 is, for example, adapted both in terms of the extent and the shape to intersection 21. The adaptation is based here on information of a navigation system present in the vehicle 23, on digital map material and on the actual speed of vehicle 23. On the other hand, the GPS positions of vehicles 24 and 26 are already within the critical zone 28 and are correspondingly characterized as "relevant" and decoded.

Furthermore, vehicle 27 is illustrated in FIG. 2, which vehicle is driving on the road 22 and is approaching the intersection 21. For example, the vehicle 27 is executing the method according to the invention. The critical zone 29 of the vehicle 27 is adapted to the road profile of the road 22, the road class of the road 22 and the actual speed of the vehicle 27. Since there are no transmitters located in the critical zone 29, no vehicle-to-X messages are characterized as relevant within the scope of the weighting of the received vehicle-to-X messages. In order to avoid leaving the available computational capacity unused, the vehicle-to-X messages which are sent by vehicles 23, 24, 25 and 26 are decoded and evaluated.

According to a further exemplary embodiment in FIG. 2, vehicle 23 does not weight the received vehicle-to-X messages exclusively as "relevant" and "irrelevant" but instead weights them with respect to one another into a number of categories corresponding to the number of received vehicle-to-X messages, with the result that all the vehicle-to-X messages are sorted according to their relevance. The most relevant vehicle-to-X messages come from vehicle 26 here, which constitutes a possible risk of collision. For this reason, the vehicle-to-X messages are firstly decoded by the vehicle 26. The still available residual computational capacity is then used to decode further received vehicle-to-X messages in a falling weighting sequence.

Figure 3:
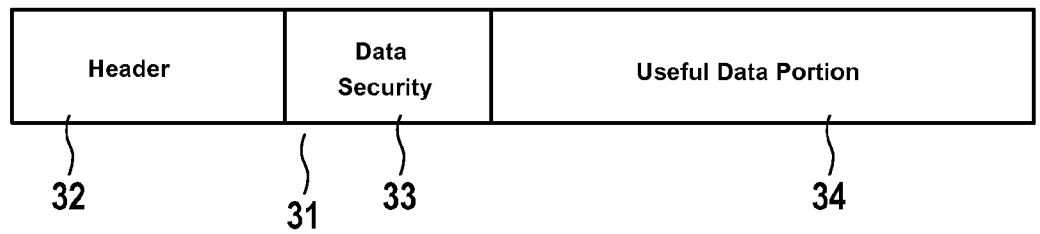
FIG. 3 is a schematic view of the data structure of a vehicle-to-X message.

The exemplary embodiment in FIG. 3 shows the data structure of the vehicle-to-X messages 31. The vehicle-to-X message 31 comprises the header data portion 32, data security portion 33 and useful data portion 34. The header data portion 32, data security portion 33 and useful data portion 34 can themselves be divided into further subportions, which is, however, not the case in this exemplary embodiment. The header data portion 32 is uncoded, the data security portion 33 is encrypted in a digital fashion and constitute a data security certificate, and the useful data portion 34 is encoded in the ASN.1 format.

Figure 4:
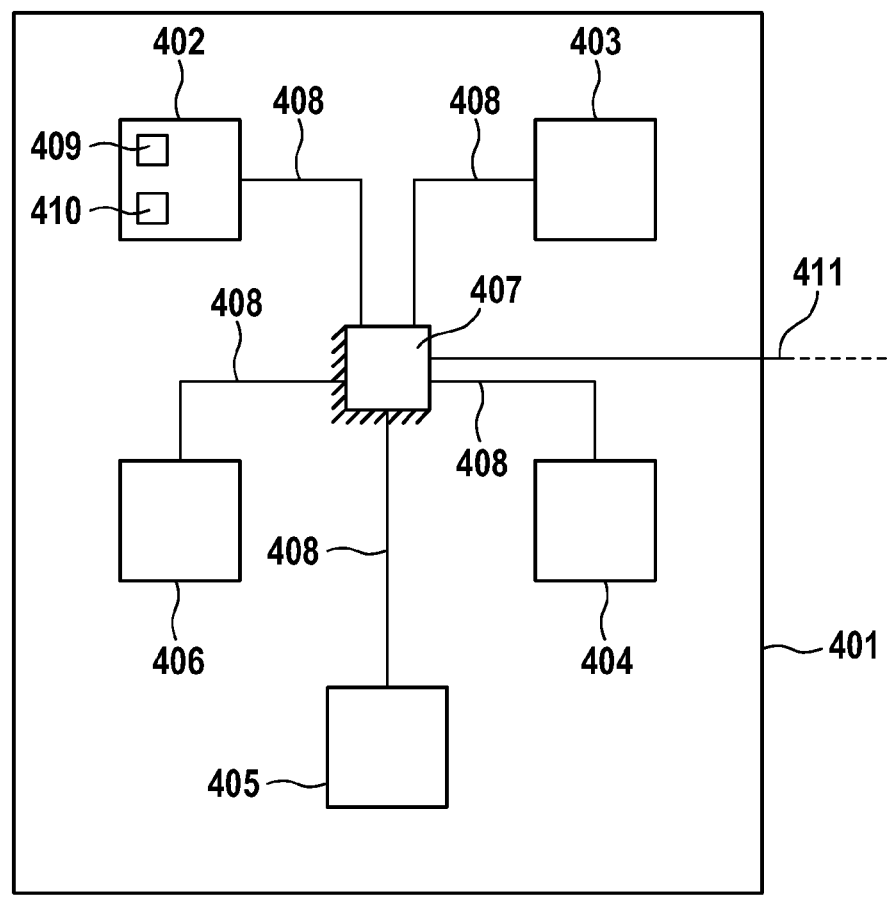
FIG. 4 is a schematic view of a possible design of the system according to the invention.

FIG. 4 illustrates the vehicle-to-X communication system 401 which is configured to carry out the method according to the invention. The vehicle-to-X communication system 401 comprises the communication unit 402, encoding unit 403, generating unit 406, weighting unit 404 and data security unit 405 which are connected to the electronic computing unit 407 via data lines 408. The communication unit 402 has WLAN connecting means 409 according to IEEE 802.11 and mobile radio connecting means 410 for receiving and transmitting vehicle-to-X messages. The generating unit 406 generates the vehicle-to-X messages to be transmitted in a header data portion, a useful data portion and a data security portion. In this exemplary embodiment, received vehicle-to-X messages are firstly checked for their data security and reliability by the data security unit 405. In this way, vehicle-to-X messages from malicious transmitters with intentionally incorrect information content are detected and rejected. The remaining vehicle-to-X messages are then passed on to the weighting unit 404. The weighting unit 404 processes the uncoded header data portions of the received vehicle-to-X messages passed on by the data security unit 405, and weights the vehicle-to-X messages on the basis of the header data portions. Weighting is performed here into the two categories "relevant" and "irrelevant", wherein the encoding unit 403 only decodes useful data portions of vehicle-to-X messages which have previously been characterized as "relevant". The encoding unit 403 encodes the useful data portions of vehicle-to-X messages, to be transmitted, according to the ASN.1 Standard, and decodes the useful data portions of received vehicle-to-X messages if there is provision for decoding in accordance with the weighting of the vehicle-to-X messages. The vehicle-to-X messages which are characterized as "irrelevant" by the weighting unit 404 are not decoded by the encoding unit 403 and are therefore not processed further by the vehicle-to-X communication system 401. The decoded useful data portions are made available to corresponding vehicle systems and driver assistance systems via the data line 411. Since all the devices which are associated with the vehicle-to-X communication system 401 jointly access the electronic computing unit 407, rapid and effective exchange of data of the devices with one another is ensured. Likewise, the computational capacity which is made available by the electronic computing unit 407 can be made available to the different devices flexibly and according to requirements. Since only the vehicle-to-X messages which are characterized as "relevant" are decoded by the encoding unit 403 on the basis of the weighting of the vehicle-to-X messages which is performed, the computational capacity of the electronic computing unit 407 can be configured in a correspondingly reduced fashion, which reduces the manufacturing costs of the entire system.

While the above description constitutes the preferred embodiment of the present invention, it will be appreciated that the invention is susceptible to modification, variation, and change without departing from the proper scope and fair meaning of the accompanying claims.

The invention claimed is:

1. A data selection method for reducing the decoding computational complexity of a vehicle-to-X communication system, comprising the steps of:
   receiving vehicle-to-X messages by an electronic communication unit in communication with an antenna, wherein the vehicle-to-X messages each includes at least one useful data portion and at least one header data portion,
   transmitting by the electronic communication unit to an electronic weighing unit the at least one header data portion in an uncoded form, wherein the at least one useful data portion in each case is transmitted in an encoded form,
   processing by the electronic weighing unit the received vehicle-to-X messages with respect to one another, and based on the processing categorizing the received vehicle-to-X messages into at least two categories on the basis of the at least one header data portion,
   decoding by an electronic encoding unit the at least one useful data portion as a function of the processing,
   wherein the electronic communication unit, electronic weighing unit, and electronic encoding unit are comprised by at least one electronic computing unit, the at least one electronic computing unit being a processor, and
   wherein the categorizing of the vehicle-to-X messages by the electronic weighing unit received during operation of a vehicle is based on at least two of the following factors:
      an actual speed of a receiver,
      a relative speed of the receiver with respect to the transmitter,
      a distance of the receiver from the transmitter,
      an expected entry point of the transmitter into a critical zone around the receiver wherein the critical zone has an adaptable extent and shape,
      a relative direction of travel of the receiver with respect to the transmitter, and
      a class of road, and wherein the class of road is formed as a function of at least one of a permissible maximum speed, a lane width, a number of lanes, vicinity to localities, and weather conditions.

2. The method as claimed in claim 1, further comprising in that encoding the at least one useful data portion includes at least one of a data compression and a data compatibilization, and the decoding of the at least one useful data portion comprises at least one of a data compression and a system-dependent data conversion.

3. The method as claimed in claim 1 wherein in that the at least one header data portion comprises at least one of the following information items:
   a satellite-supported position information of a transmitter,
   a speed information of the transmitter,
   an orientation information of the transmitter,
   an identification information of the transmitter,
   a time stamp,
   a type information of the vehicle-to-X message, and
   an accuracy characterization of at least one of the at least one information items.

4. The method as claimed in claim 1 wherein the header data portion has a data format which can be processed essentially by a variety of configurations of the vehicle-to-X communication systems without preceding decoding.

5. The method as claimed in claim 1 further comprising in that the weighting is performed in a number of categories corresponding to the number of the received vehicle-to-X messages, wherein the useful data portions of the received vehicle-to-X messages are decoded in a falling weighting sequence until the computational capacity is exhausted or all the useful data portions of the received vehicle-to-X messages are decoded.

6. The method as claimed in claim 1 further comprising in that the decoding of the useful data portion is preceded by a data security checking of a data security portion of the vehicle-to-X message, by data security checking, of a digital data security certificate which is included in the vehicle-to-X message.

7. The method as claimed in claim 1 further comprising the useful data portion is further processed by at least one driver assistance system, wherein the at least one driver assistance system is designed to at least one of warn a driver, engage in the vehicle controller, and to oversteer a driver's predefined value.

8. The method as claimed in claim 2, wherein in that the encoding takes place according to the Abstract Syntax Notation One Standard.

9. A vehicle-to-X communication system, comprising:
   an electronic computing unit, wherein the electronic computing unit is a processor;
   an electronic communication unit in communication with the electronic computing unit, the electronic communication unit configured to receive and transmit vehicle-to-X messages from an antenna,
   an electronic encoding unit in communication with the electronic computing unit, for encoding at least one useful data portion of the vehicle-to-X messages to be transmitted, and for decoding at least one encoded useful data portion of received vehicle-to-X messages,
   an electronic weighting unit in communication with the electronic computing unit, for processing in each case at least one uncoded header data portion of the received vehicle-to-X messages, and
   in that the electronic weighting unit is configure to process the received vehicle-to-X messages with respect to one another and classify the received vehicle-to-X messages into at least two categories on the basis of the at least one header data portion, wherein the electronic encoding unit is configured to carry out decoding with the at least one useful data portion as a function of the processing,
   wherein the electronic communication unit, the electronic generating unit, the electronic encoding processor unit, and the processor unit are in communication with the electronic computing unit via data lines, and
   wherein the categorizing of the vehicle-to-X messages by the electronic weighing unit received during operation of a vehicle is based on at least two of the following factors:
      an actual speed of a receiver,
      a relative speed of the receiver with respect to the transmitter,
      a distance of the receiver from the transmitter,
      an expected entry point of the transmitter into a critical zone around
      the receiver wherein the critical zone has an adaptable extent and shape,
      a relative direction of travel of the receiver with respect to the transmitter, and
      a class of road, and wherein the class of road is formed as a function of at least one of a permissible maximum speed, a lane width, a number of lanes, vicinity to localities, and weather conditions.

10. The system as claimed in claim 9, wherein in that the system additionally comprises a data security unit in communication with the electronic computing unit, for producing a data security portion of the vehicle-to-X messages to be transmitted and for checking the data security portion of the received vehicle-to-X messages.

11. The system as claimed in claim 9 further comprising in that at least one of the communication unit, the generating unit, the weighting unit, the encoding unit, and the data security unit comprise a common chip set of a common electronic computing unit.

12. The system as claimed in claim 9, in that the communication unit is configured to communicate by means of at least one of the following types of connection:
- a WLAN connection according to IEEE 802.11,
- an ISM connection
- a Bluetooth interface,
- a ZigBee interface,
- a UWB interface,
- a WiMax interface,
- a infrared link and
- a mobile radio link.

* * * * *